US009982465B2

(12) United States Patent
Lee

(10) Patent No.: US 9,982,465 B2
(45) Date of Patent: May 29, 2018

(54) LOCKING MECHANISM AND RELATED ELECTRONIC DEVICE CAPABLE OF BEING SWITCHED FOR SWITCHABLE SECURITY LOCKS WITH DIFFERENT DESIGN

(71) Applicant: Wistron Corporation, New Taipei (TW)

(72) Inventor: Hung-Yi Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 292 days.

(21) Appl. No.: 14/641,457

(22) Filed: Mar. 9, 2015

(65) Prior Publication Data

US 2016/0090756 A1    Mar. 31, 2016

(30) Foreign Application Priority Data

Sep. 25, 2014   (TW) .............................. 103133368 A

(51) Int. Cl.
*E05C 19/08* (2006.01)
*E05B 73/00* (2006.01)
(Continued)

(52) U.S. Cl.
CPC ............ *E05B 73/0082* (2013.01); *G06F 1/16* (2013.01)

(58) Field of Classification Search
CPC ........ E05B 73/00; E05B 73/0082; G06F 1/16; Y10T 403/60; Y10T 403/602; Y10T 403/604; Y10T 403/608
(Continued)

(56) References Cited

U.S. PATENT DOCUMENTS 1,451,970 A * 4/1923 Taylor ................... B25B 31/005
                                                        411/418
2,517,364 A * 8/1950 Torresen ................... F16B 5/10
                                                        411/432
(Continued)

FOREIGN PATENT DOCUMENTS

TW          I422307        1/2014
TW          I422308        1/2014
TW          M474788 U      3/2014

OTHER PUBLICATIONS

Office action dated Sep. 22, 2015 for the Taiwan application No. 103133368, filing date: Sep. 25, 2014, p. 1 line 11-14, p. 2 and p. 3 line 1,5-7.

*Primary Examiner* — Kristina Fulton
*Assistant Examiner* — Faria Ahmad
(74) *Attorney, Agent, or Firm* — Winston Hsu

(57) ABSTRACT

A locking mechanism selectively suitable for security locks with different design includes a first locking component, a second locking component and a pivoting component. The first locking component includes a first body, a first stretching portion and a second stretching portion. A first locking hole is formed on the first body. A first piercing hole, a first constraining hole and a second constraining hole are formed on the first stretching portion. A second piercing hole and a slide slot are formed on the second stretching portion. The second locking component includes a second body whereon a second locking hole, a third piercing hole and a third constraining hole are formed. The pivoting component includes a shaft, a first block and a second block. The shaft pieces through the foresaid piercing holes. The first block and the second block are movably switched between the foresaid constraining holes and the slide slot.

20 Claims, 9 Drawing Sheets

(51) Int. Cl.
*G06F 1/16* (2006.01)
*E05C 3/02* (2006.01)

(58) Field of Classification Search
USPC ........ 292/281, 194, DIG. 53, DIG. 54; 70/2, 70/14, 58; 16/320
See application file for complete search history.

(56) References Cited

U.S. PATENT DOCUMENTS

| | | | | | |
|---|---|---|---|---|---|
| 3,263,461 | A * | 8/1966 | Tartaglia | ............... | E05B 29/004 70/358 |
| 3,402,958 | A * | 9/1968 | Barry | ............... | E05C 3/042 292/62 |
| 4,492,394 | A * | 1/1985 | Dignan | ............... | E05C 3/042 292/64 |
| 4,556,244 | A * | 12/1985 | Bisbing | ............... | E05B 17/025 292/336.3 |
| 4,583,775 | A * | 4/1986 | Bisbing | ............... | E05B 17/0025 292/64 |
| 4,763,935 | A * | 8/1988 | Bisbing | ............... | E05B 17/0025 292/66 |
| 5,038,589 | A * | 8/1991 | Martin | ............... | E05B 9/084 70/368 |
| 5,234,236 | A * | 8/1993 | Gromotka | ............... | E05B 63/0056 292/194 |
| 5,263,344 | A * | 11/1993 | Madison | ............... | D06F 39/12 70/14 |
| 5,263,348 | A * | 11/1993 | Wittwer | ............... | E05B 17/0058 70/223 |
| 5,315,850 | A * | 5/1994 | Edeus | ............... | E05B 17/2053 292/153 |
| 5,338,133 | A * | 8/1994 | Tornero | ............... | A47C 1/03 248/415 |
| 5,374,103 | A * | 12/1994 | Stange | ............... | A47C 7/72 248/27.1 |
| 5,660,442 | A * | 8/1997 | Tornero | ............... | A47C 1/03 248/118 |
| 5,674,027 | A * | 10/1997 | Warnaar | ............... | F16C 11/045 16/297 |
| 5,688,093 | A * | 11/1997 | Bowers | ............... | F16B 5/10 411/544 |
| 5,732,580 | A * | 3/1998 | Garnault | ............... | E05B 17/04 70/360 |
| 5,746,074 | A * | 5/1998 | Collins | ............... | A01D 34/828 70/14 |
| 5,980,177 | A * | 11/1999 | Schiess | ............... | F16B 39/025 411/299 |
| 6,050,114 | A * | 4/2000 | Park | ............... | E05B 67/383 292/281 |
| 6,085,557 | A * | 7/2000 | Kaye, Jr. | ............... | B63J 99/00 416/245 A |
| 6,164,097 | A * | 12/2000 | McBryde | ............... | E05B 67/383 70/18 |
| 6,393,875 | B1 * | 5/2002 | Garel | ............... | E05B 67/36 70/14 |
| 6,409,266 | B1 * | 6/2002 | Chen | ............... | A47C 1/03 297/383 |
| 6,572,195 | B1 * | 6/2003 | Lee | ............... | A47C 1/03 297/411.35 |
| 6,640,592 | B2 * | 11/2003 | Vickers | ............... | E05B 17/04 292/64 |
| 6,868,705 | B2 * | 3/2005 | Miao | ............... | E05B 17/04 70/222 |
| 7,080,885 | B2 * | 7/2006 | Bain | ............... | A47C 1/03 297/353 |
| 7,243,997 | B1 * | 7/2007 | Tornero | ............... | A47C 1/03 297/383 |
| 8,408,609 | B2 * | 4/2013 | Brojanac | ............... | E05B 67/383 292/285 |
| 8,842,422 | B2 * | 9/2014 | Hung | ............... | E05B 73/0005 361/679.01 |
| 8,893,353 | B2 * | 11/2014 | Shih | ............... | G06F 1/1681 16/303 |
| 8,943,649 | B2 * | 2/2015 | Chen | ............... | G06F 1/1681 16/320 |
| 9,189,032 | B2 * | 11/2015 | Jheng | ............... | G06F 1/1681 |
| 9,578,971 | B2 * | 2/2017 | Su | ............... | A47C 1/03 |
| 2003/0159476 | A1 * | 8/2003 | Bellow, Jr. | ............... | E05B 73/0082 70/58 |
| 2003/0167806 | A1 * | 9/2003 | Witchey | ............... | B60D 1/02 70/14 |
| 2004/0261479 | A1 * | 12/2004 | Miao | ............... | E05B 17/04 70/492 |
| 2005/0241348 | A1 * | 11/2005 | Devecki | ............... | B63C 11/02 70/18 |
| 2005/0262904 | A1 * | 12/2005 | Ling | ............... | E05B 67/003 70/49 |
| 2005/0268675 | A1 * | 12/2005 | Loudon | ............... | E05B 73/0082 70/58 |
| 2006/0075794 | A1 * | 4/2006 | Ling | ............... | E05B 71/00 70/58 |
| 2006/0236730 | A1 * | 10/2006 | Wyers | ............... | E05B 1/065 70/14 |
| 2008/0186665 | A1 * | 8/2008 | Kuo | ............... | E05B 17/2038 361/679.57 |
| 2011/0113558 | A1 * | 5/2011 | Olszewski | ............... | A61G 13/101 5/658 |
| 2011/0203327 | A1 * | 8/2011 | Fong | ............... | E05B 67/383 70/14 |
| 2012/0224308 | A1 | 9/2012 | Lu | | |
| 2013/0279973 | A1 * | 10/2013 | Li | ............... | H05K 7/02 403/327 |
| 2014/0326026 | A1 * | 11/2014 | LaCivita | ............... | E05B 73/00 70/58 |
| 2016/0060912 | A1 * | 3/2016 | Matthews | ............... | F41B 15/027 70/14 |

* cited by examiner

LOCKING MECHANISM AND RELATED ELECTRONIC DEVICE CAPABLE OF BEING SWITCHED FOR SWITCHABLE SECURITY LOCKS WITH DIFFERENT DESIGN

BACKGROUND OF THE DISCLOSURE

1. Field of the Disclosure

The present disclosure relates to a locking mechanism and a related electronic device for security locks, and more particularly, to a locking mechanism and a related electronic device capable of being switched for security locks with different design.

2. Description of the Prior Art

The portable computer device including a tablet computer and a notebook computer has features of slight volume and cheap price. The portable computer device is often put on a public place for information research or Internet connection, and the security lock and the connective cable are applied to prevent the portable computer device from being stolen. The common security lock mainly includes the Kensington security lock and the Noble security lock. The Kensington security lock utilizes an engaging kit to rotatably assemble with the portable computer device, and the Noble security lock utilizes a buckling cable suite to assemble with the portable computer device. Design of the Kensington security lock and the Noble security lock are different, so that the portable computer device has to own the specific locking mechanism matched with the chose security lock. The conventional locking mechanism is only applied to the individual matched security lock but cannot be utilized for other security locks.

SUMMARY OF THE DISCLOSURE

The present disclosure provides a locking mechanism and a related electronic device capable of being switched for security locks with different design for solving above drawbacks.

According to the claimed disclosure, a locking mechanism suitable for switchable security locks with different design includes a first locking component, a second locking component and a pivoting component. The first locking component includes a first body whereon a first locking hole is formed, and at least two stretching portions disposed on an end of the first body. Each of the two stretching portions has at least two piercing holes, at least two constraining holes and a sliding slot connected to each other. The at least two constraining holes and the sliding slot are formed on edges of the at least two piercing holes. The second locking component is rotatably buckled between the at least two stretching portions. The second locking component includes a second body having another piercing hole and another constraining hole connected to each other and a second locking hole. The foresaid another constraining hole is formed on an edge of the foresaid another piercing hole. The second locking hole and the foresaid another piercing hole are respectively located on opposite ends of the second body. The pivoting component includes a shaft and at least two blocks. The shaft passes through the piercing holes on the first locking component and the second locking component. The at least two blocks are disposed on a lateral surface of the shaft. One of the at least two blocks is adapted to movably switch between the constraining holes on the first locking component and the second locking component, and the other block is adapted to movably switch between the sliding slot on the first locking component and the constraining hole on the second locking component.

According to the claimed disclosure, the at least two blocks are disposed on the lateral surface along an axial direction of the shaft.

According to the claimed disclosure, the at least two piercing holes align with each other, and the sliding slot aligns with the at least two constraining holes.

According to the claimed disclosure, the pivoting component moves relative to the first locking component and the second locking component to be switched between a first position and a second position. One of the at least two blocks is engaged with one of the constraining holes on the first locking component, and the other block is engaged with the constraining hole on the second locking component when the pivoting component is switched to the first position. One of the at least two blocks is engaged with the constraining hole on the second locking component, and the other block is movably located inside the sliding slot when the pivoting component is switched to the second position.

According to the claimed disclosure, one of the at least two blocks is engaged with the constraining hole on the second locking component, and the other block is engaged with at least one constraining hole on the first locking component. The second locking component is rotatably switched relative to the first locking component to be set on a first mode or a second mode.

According to the claimed disclosure, the first locking component further includes at least one fixing portion disposed on an outer side of the first body. The first locking component is installed on a casing via the fixing portion.

According to the claimed disclosure, the locking mechanism further includes a bridging component passing through the piercing holes on the first locking component and the second locking component. An opening of the bridging component aligns with the sliding slot and the constraining hole on the second locking component, and is movably switched between the at least two constraining holes on the first locking component.

According to the claimed disclosure, the locking mechanism further includes a resilient component disposed between the pivoting component and one of the at least two stretching portions.

According to the claimed disclosure, the locking mechanism further includes a covering component disposed on one of the at least two stretching portions to contact against the resilient component.

According to the claimed disclosure, the at least two constraining holes are respectively formed on different positions on the edges of the corresponding piercing holes. The sliding slot is an arc slot, and an arc length of the arc slot overlaps the at least two constraining holes.

According to the claimed disclosure, an electronic device suitable for switchable security locks with different design includes a casing and a locking mechanism. The casing includes an accommodating structure. The locking mechanism includes a first locking component, a second locking component and a pivoting component. The first locking component includes a first body, a first stretching portion and a second stretching portion. The first body is disposed inside the accommodating structure, and a first locking hole is formed on the first body. The first stretching portion is disposed on an end of the first body. The first stretching portion has a first piercing hole, a first constraining hole and a second constraining hole connected to each other. The second stretching portion is disposed on the end and adjacent to the first stretching portion. The second stretching portion has a second piercing hole and a sliding slot connected to each other. The second locking component is rotatably buckled between the first stretching portion and the second stretching portion. The second locking component includes a second body having a third piercing hole and a third constraining hole connected to each other and a second locking hole. The second locking hole and the third piercing hole are respectively located on opposite ends of the second body, and one of the security locks is assembled with the first locking hole or the second locking hole alternatively. The pivoting component includes a shaft, a first block and a second block. The shaft passes through the first piercing hole, the second piercing hole and the third piercing hole. The first block is disposed on a lateral surface of the shaft to be movably switched to the first constraining hole, the second constraining hole or the third constraining hole. The second block is disposed on the lateral surface and located by the first block to be movably switched to the third constraining hole or the sliding slot.

According to the claimed disclosure, the casing further includes a sheltering component rotatably disposed on the accommodating structure.

The present disclosure assembles two locking components in a rotatable manner, and the pivoting component can be pressed and recovered to adjust rotary angles of the two locking components, so as to determine whether the first locking component or the second locking component is applied to match with the security lock with the corresponding design. A mark can be formed on a top of the pivoting component or an outer surface of the casing, and the user can visually distinguish modes of the locking mechanism conveniently. For expanding application of the locking mechanism, an interval between the first stretching portion and the second stretching portion can be enlarged, one or more locking components can be disposed between the two stretching portions, and a locking hole on the extra locking component is different from the first locking hole on the first locking component and the second locking hole on the second locking component. Accordingly, the pivoting component can have an additional block which is located on a position corresponding to the constraining hole on the extra locking component, and the pivoting component can be pressed and rotated to switch activation of the selected locking component. Comparing to the prior art, the electronic device having the locking mechanism of the present disclosure can be applied to the security lock with any predetermined design, so as to effectively decrease product cost of the electronic device, to economize inner disposal space of the casing, and to provide high compatibility of market application.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
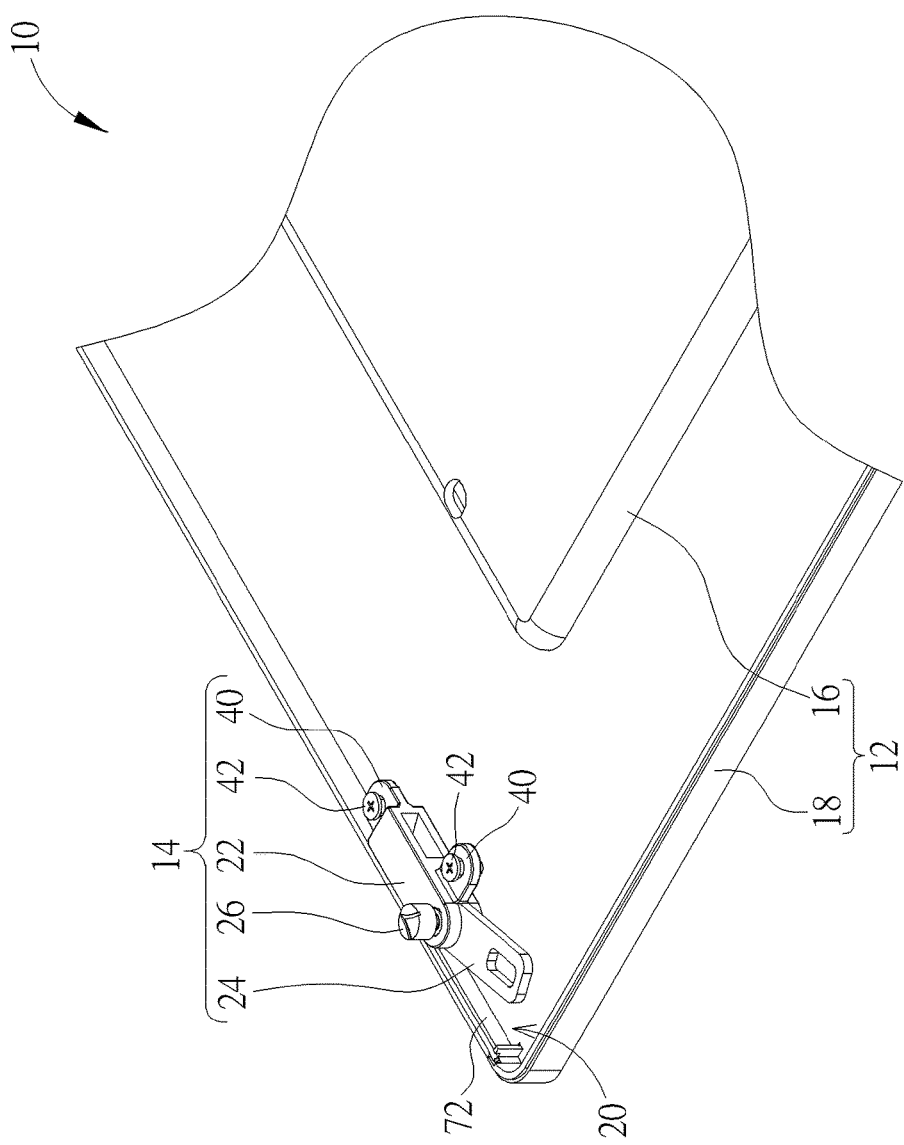
FIG. 1 and FIG. 2 respectively are diagrams of an electronic device in different operational modes according to an embodiment of the present disclosure.
Figure 2:
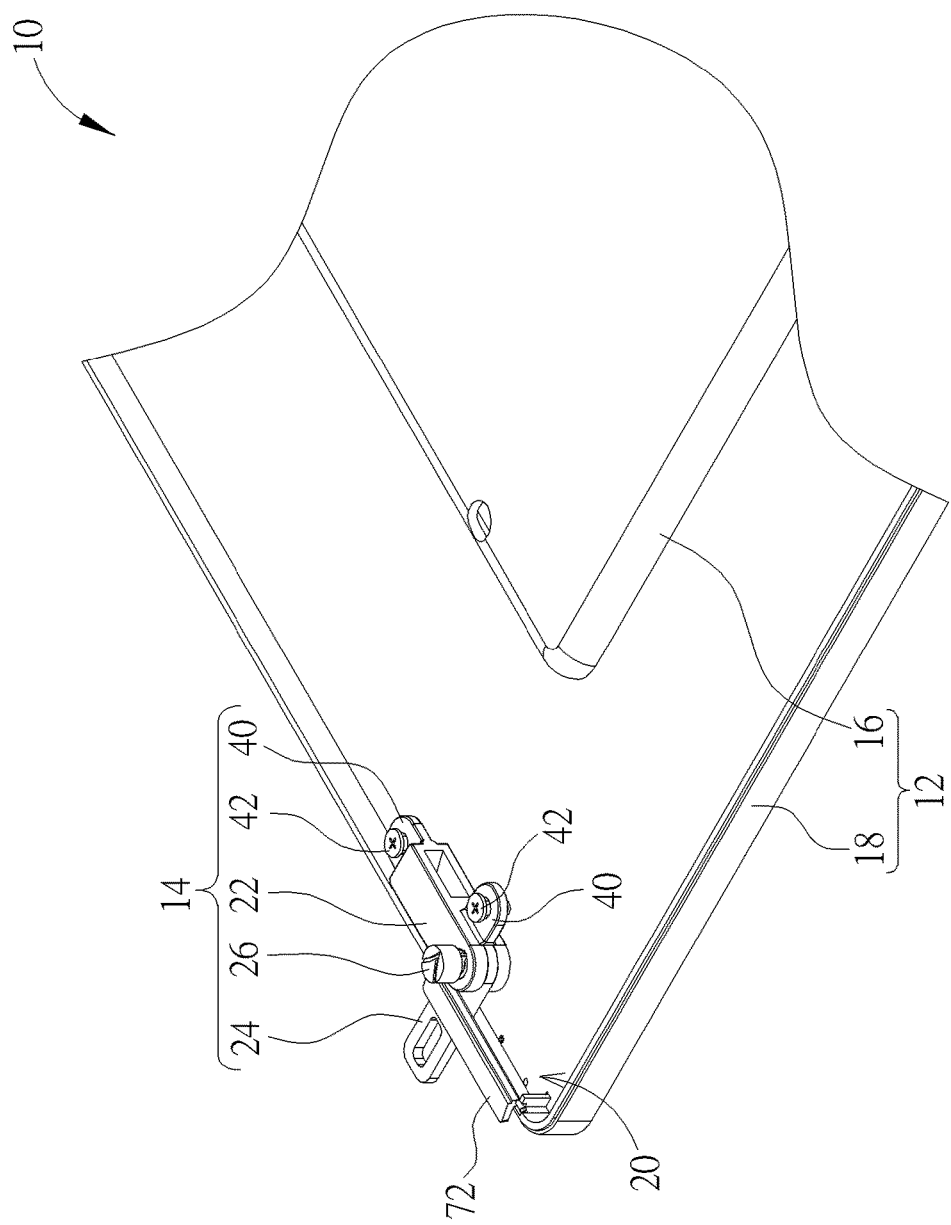

Please refer to FIG. 1 and FIG. 2. FIG. 1 and FIG. 2 respectively are diagrams of an electronic device 10 indifferent operational modes according to an embodiment of the present disclosure. The electronic device 10 includes a casing 12 and a locking mechanism 14. The casing 12 includes an upper cover 16 and a low cover 18 assembled with each other, and the low cover 18 includes an accommodating structure 20. The locking mechanism 14 is disposed inside the accommodating structure 20. The locking mechanism 14 includes a plurality of locking components matched with security locks with different design, respectively. In different operational modes, a part of the locking component can be optionally moved in or out of the accommodating structure 20 to be matched with the corresponding security lock. In the embodiment, the locking mechanism 14 includes two locking components, and the electronic device 10 can be applied to two kinds of security locks. An amount of the locking component is not limited to the above-mentioned embodiment, which can be varied according to an amount of the security lock.

Figure 3:
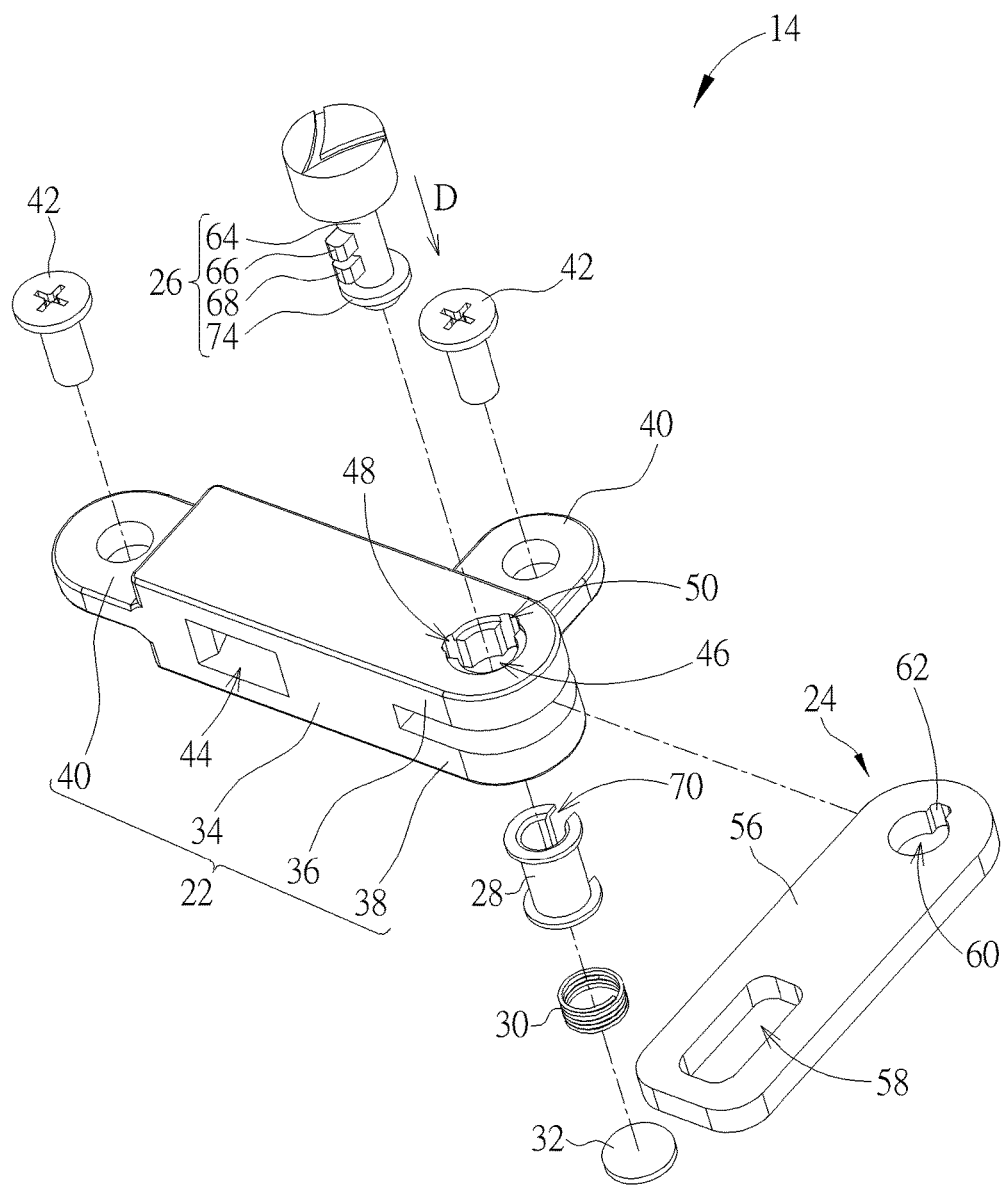
FIG. 3 and FIG. 4 respectively are exploded diagrams of a locking mechanism in different views according to the embodiment of the present disclosure.
Figure 4:
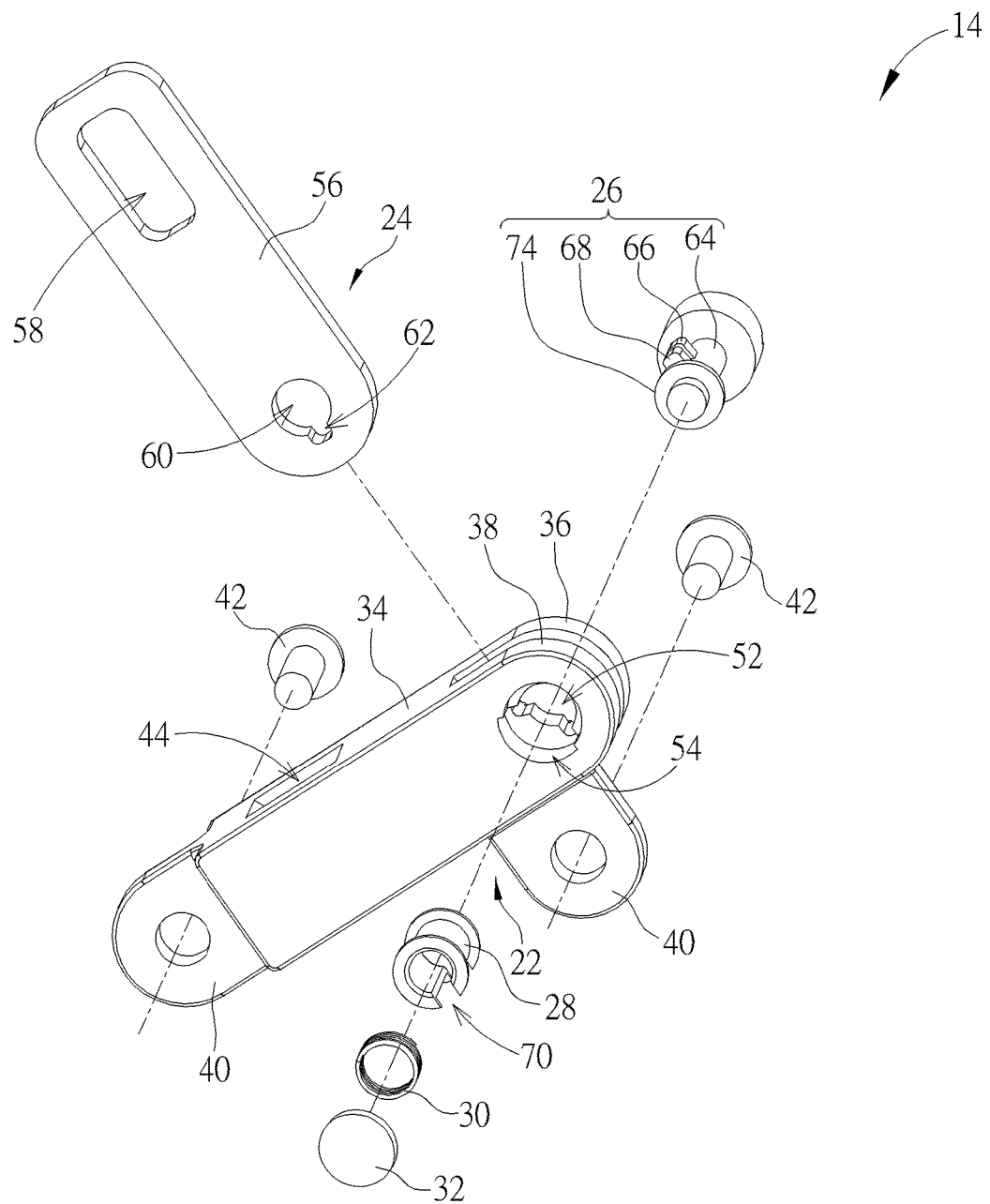
Figure 5:
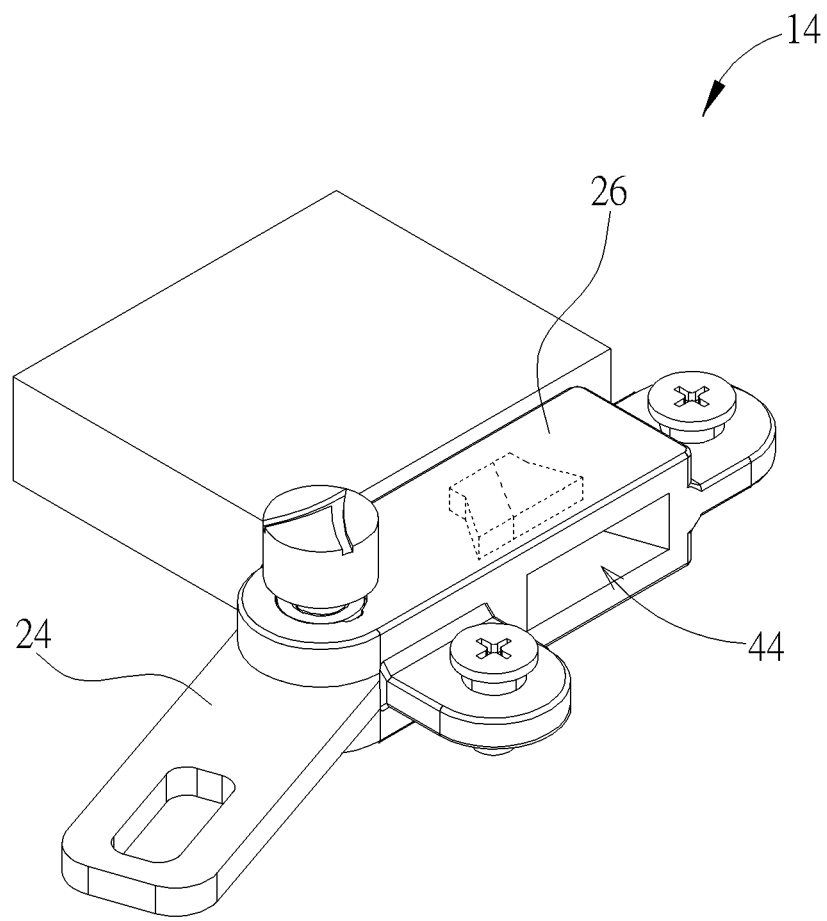
FIG. 5 and FIG. 6 respectively are assembly diagrams of the locking mechanism in different operational modes according to the embodiment of the present disclosure.
Figure 6:
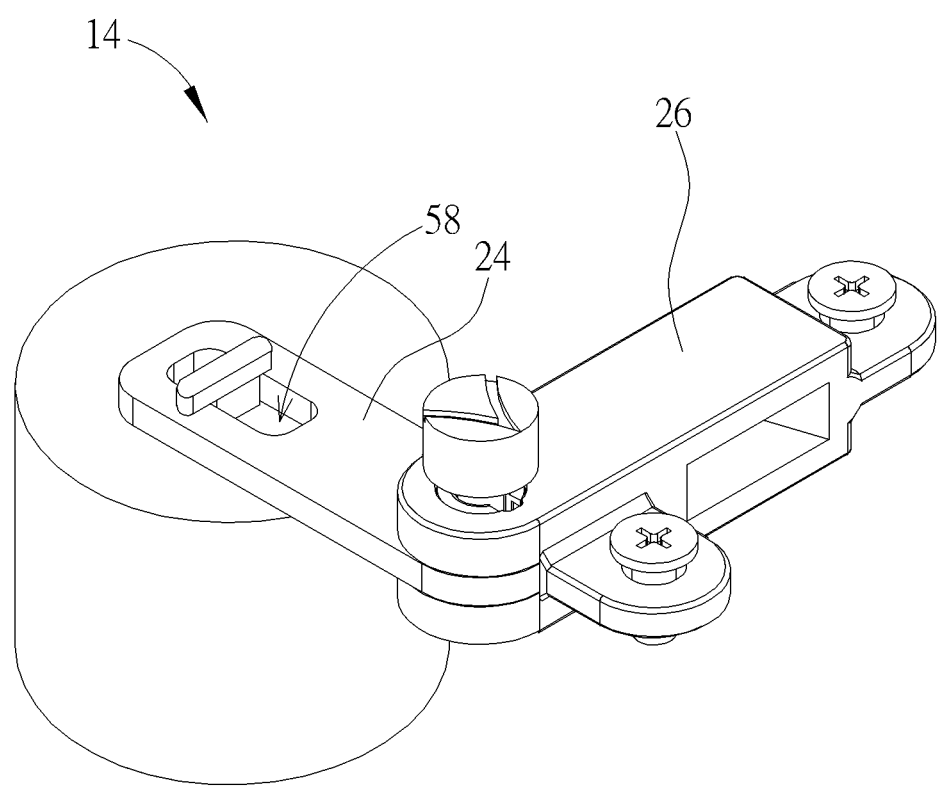

Please refer to FIG. 3 to FIG. 6. FIG. 3 and FIG. 4 respectively are exploded diagrams of the locking mechanism 14 in different views according to the embodiment of the present disclosure. FIG. 5 and FIG. 6 respectively are assembly diagrams of the locking mechanism 14 in different operational modes according to the embodiment of the present disclosure. Further, FIG. 7 to FIG. 9 respectively are diagrams of the pivoting component 26 in different positions according to the embodiment of the present disclosure. The locking mechanism 14 includes a first locking component 22, a second locking component 24, a pivoting component 26, a bridging component 28, a resilient component 30 and a covering component 32. The first locking component 22 includes a first body 34, at least two stretching portions (such as the first stretching portion 36 and the second stretching portion 38) and a fixing portion 40. The first body 34 is hidden inside accommodating structure 20. The fixing portion 40 is connected to an outer side of the first body 34, and the fixing component 42 (such as the screw or the bolt) passes through the fixing portion 40 to install the first locking component 22 into the casing 12.

The first body 34 has a first locking hole 44 which conforms to the security lock with specific standards. The first stretching portion 36 and the second stretching portion 38 are disposed on the same side of the first body 34 and adjacent by each other. The first stretching portion 36 has a first piercing hole 46 and at least two constraining holes (such as the first constraining hole 48 and the second constraining hole 50) connected to each other. Dimension of the first piercing hole 46 is larger than dimensions of the first constraining hole 48 and the second constraining hole 50. The first constraining hole 48 and the second constraining hole 50 are formed on an edge of the first piercing hole 46. The second stretching portion 38 has a second piercing hole 52 and a sliding slot 54 connected to each other. Dimension of the second piercing hole 52 is substantially equal to dimension of the first piercing hole 46, and the sliding slot 54 is an arc slot formed on an edge of the second piercing hole 52. The pivoting component 26 sequentially passes through the first stretching portion 36. The second locking component 24 and the second stretching portion 38, the second piercing hole 52 preferably aligns with the first piercing hole 46, and the sliding slot 54 preferably aligns with the first constraining hole 48 and the second constraining hole 50, which means an arc length of the sliding slot 54 (the arc slot) overlaps the first constraining hole 48 and the second constraining hole 50.

The second locking component 24 is rotatably buckled between the first stretching portion 36 and the second stretching portion 38. The second locking component 24 includes a second body 56. The second body 56 includes a second locking hole 58, and a third piercing hole 60 and a third constraining hole 62 connected to each other. The second locking hole 58 is applied to be combined with the security lock with the related standards. Dimension of the third piercing hole 60 is substantially equal to dimensions of the first piercing hole and/or the second piercing hole 52. Dimension of the third constraining hole 62 substantially corresponds to dimensions of the first constraining hole 48 and/or the second constraining hole 50, and the third constraining hole 62 is formed on an edge of the third piercing hole 60. The second locking hole 58 and the third piercing hole 60 are preferably located to two ends of the second body 56. It should be mentioned that shape of the first locking hole 44 is different from shape of the second locking hole 58. In the embodiment, the first body 34 is preferably made of Zinc-alloy steel (ZN-5), and the first locking component 22 is the Noble-form locking unit matched with the Noble security lock. The second body 56 is preferably made of alloy steel with 0.6 carbon content (SK7), and the second locking component 24 is the Kensinton-form locking unit matched with the Kensinton security lock. Material and matched form of the locking component are not limited to the above-mentioned embodiments, which depend on design demand.

The pivoting component 26 includes a shaft 64 and at least two blocks (such as the first block 66 and the second block 68). The shaft 64 movably passes through the first piercing hole 46, the second piercing hole 52 and the third piercing hole 60. The first block 66 and the second block 68 are disposed on a lateral surface of the shaft 64 and adjacent by each other. As a movement of the shaft 64, the first block 66 can be movably switched to the first constraining hole 48, the second constraining hole 50 or the third constraining hole 60, and the second block 68 can be switched to the third constraining hole 60 or the sliding slot 54 accordingly. Therefore, the second block 68 is disposed by the first block 66 along an axial direction D of the shaft 64 preferably. When the pivoting component 26 is pressed to move relative to the first locking component 22 and the second locking component 24, the first block 66 and the second block 68 can be smoothly switched between the first stretching portion 36, the second stretching portion 38 and the second body 56. The pivoting component 26 further can include a stopper 74, which contacts against the bridging component 26 (or the second stretching portion 38 and the second body 56 optionally) to prevent the pivoting component 26 from being separated from the first locking component 22.

The bridging component 28 is preferably made of SUS301 alloy steel (stainless steel). The bridging component 28 passes through the first piercing hole 46, the second piercing hole 52 and the third piercing hole 60. An opening 70 of the bridging component 28 aligns with the sliding slot 54 and the third constraining hole 62, and can be movably switched between the first constraining hole 48 and the second constraining hole 50 according to rotation of the pivoting component 26. The resilient component 30 preferably can be a compressive spring disposed between the pivoting component 26 and the second stretching portion 38. Resilient recovering force of the resilient component 30 drives the pivoting component 26 to move from the second position shown in FIG. 8 to the first position shown in FIG. 7. The covering component 32 is disposed on a bottom of the second stretching portion 38, to contact against the resilient component 30 and to prevent the resilient component 30 from being fallen from the second piercing hole 52. The covering component 32 and the second stretching portion 38 are two separated component that can be detachably assembled with other.

The covering component 32 further can be integrated with the second stretching portion 38 monolithically. For example, the second piercing hole 52 can be a sunken structure and does not pierce through two opposite surfaces of the second stretching portion 38, and the covering component 32 can be the bottom of the second stretching portion 38. Besides, the casing 12 can include a sheltering component 72 pivotally disposed on the upper cover 16 or the low cover 18. The sheltering component 72 shown in FIG. 1 and FIG. 2 is pivotally disposed on the low cover 18, and can rotate relative to the casing 12 to shelter or to expose the accommodating structure 20 for dustproof and waterproof function.

As shown in FIG. 3 to FIG. 5, the second locking component 24 rotates relative to the first locking component 22 to be switched into the first mode, the first block 66 is engaged with the first constraining hole 48, and the second block 68 is engaged with the third constraining hole 62. The second locking component 24 is hidden inside the accommodating structure 20, and the Noble security lock can be assembled with the first locking hole 44 to protect the electronic device 10 for theft prevention. As shown in FIG. 3, FIG. 4 and FIG. 6, the second locking component 24 rotates relative to the first locking component 22 to be switched into the second mode, the first block 66 is engaged with the second constraining hole 50, and the second block 68 is engaged with the third constraining hole 62. The second locking component 24 pushes the sheltering component 72 to be moved out of the accommodating structure 20, and the Kensinton security lock can be assembled with the second locking hole 58 to protect the electronic device 10 for theft prevention. The locking mechanism 14 may include more than two locking components, and each of the locking components can be moved out of the accommodating structure 20 respectively by the pivoting component 26, so the user can select the locking component with the designate standards corresponding to design of the chose security lock.

Figure 7:
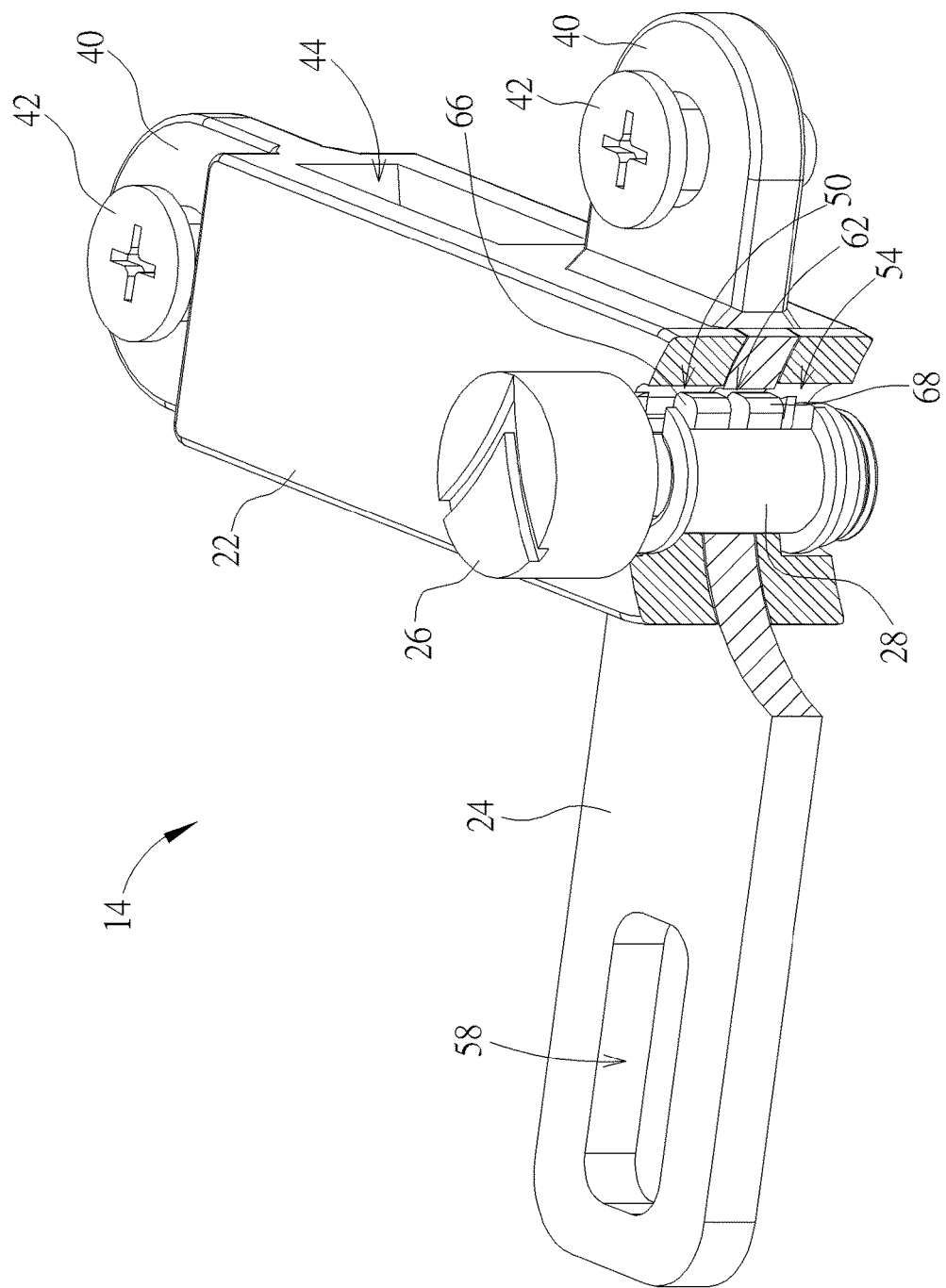
FIG. 7 to FIG. 9 respectively are diagrams of a pivoting component in different positions according to the embodiment of the present disclosure.
Figure 8:
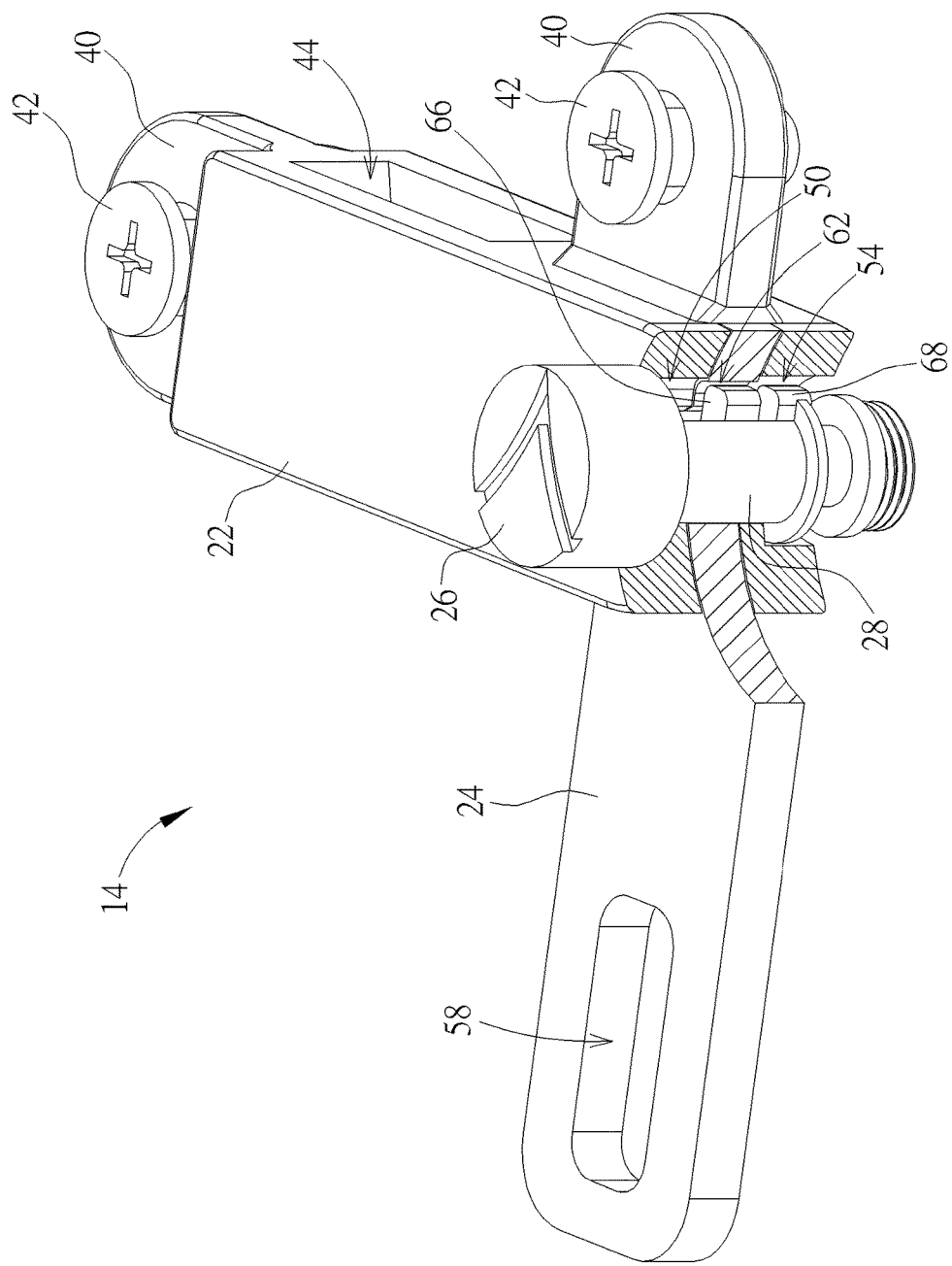
Figure 9:
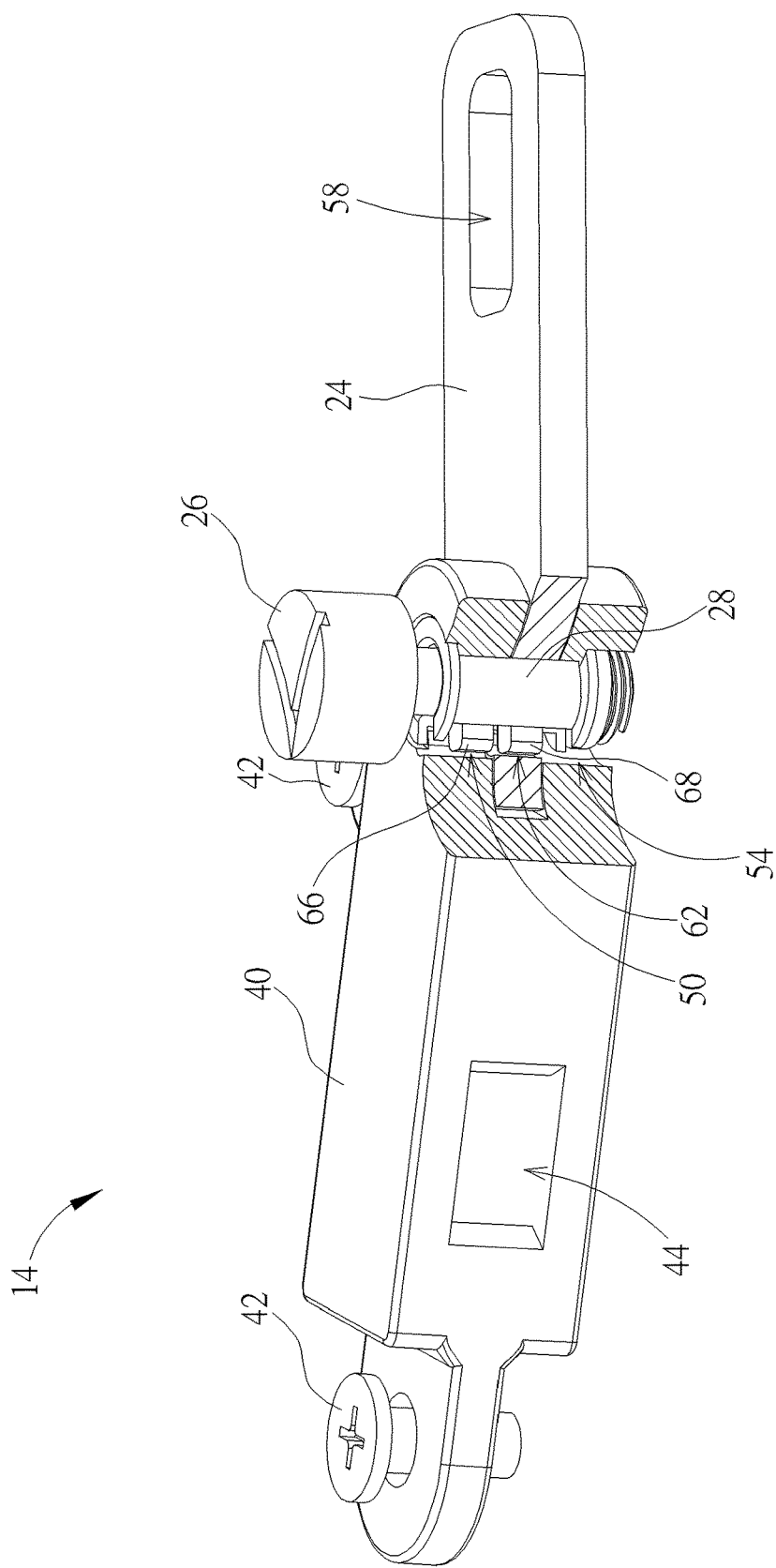

The locking mechanism 14 is switched between the first position and the second position since the pivoting component 26 moves along the axial direction D. When the pivoting component 26 is located at the first position, the second locking component 24 cannot rotate relative to the first locking component 22. When the pivoting component 26 is located at the second position, the second locking component 24 can rotate relative to the first locking component 22 and be switched to the first mode or the second mode. As shown in FIG. 7, an external force is not applied to the pivoting component 26, the resilient component 30 drives the pivoting component 26 to locate at the first position, the first block 66 is engaged with the second constraining hole 50, the second block 68 is engaged with the third constraining hole 62, and the second locking component 24 stays in the second mode; meanwhile, the pivoting component 26 is constrained by the first stretching portion 36 without rotation. As shown in FIG. 8, the external force is applied to the pivoting component 26 to compress the resilient component 30, the pivoting component 26 can be switched to the second position, the first block 66 is engaged with the third constraining hole 62 and the second block 68 is movably located inside the sliding slot 54, and the pivoting component 26 can be freely rotated to switch the second locking component 24 from the second mode to the first mode. As shown in FIG. 9, the first block 66 is engaged with the first constraining hole 48, the second block 68 is engaged with the third constraining hole 62, and the second locking component 24 stays in the first mode. Generally, a rotary range of the pivoting component 26 is adjustable according to the arc length of the sliding slot 54.

The present disclosure assembles two locking components in a rotatable manner, and the pivoting component can be pressed and recovered to adjust rotary angles of the two locking components, so as to determine whether the first locking component or the second locking component is applied to match with the security lock with the corresponding design. A mark can be formed on a top of the pivoting component or an outer surface of the casing, and the user can visually distinguish modes of the locking mechanism conveniently. For expanding application of the locking mechanism, an interval between the first stretching portion and the second stretching portion can be enlarged, one or more locking components can be disposed between the two stretching portions, and a locking hole on the extra locking component is different from the first locking hole on the first locking component and the second locking hole on the second locking component. Accordingly, the pivoting component can have an additional block which is located on a position corresponding to the constraining hole on the extra locking component, and the pivoting component can be pressed and rotated to switch activation of the selected locking component. Comparing to the prior art, the electronic device having the locking mechanism of the present disclosure can be applied to the security lock with any predetermined design, so as to effectively decrease product cost of the electronic device, to economize inner disposal space of the casing, and to provide high compatibility of market application.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A locking mechanism suitable for switchable security locks with different design, the locking mechanism comprising:
    a first locking component, comprising:
        a first body whereon a first locking hole is formed; and
        at least two stretching portions disposed on an end of the first body, each of the two stretching portions having a piercing hole, at least two constraining holes and a sliding slot connected to each other, the piercing hole misaligning with and being not communicated with the first locking hole, the at least two constraining holes and the sliding slot being formed on an edge of the piercing hole;
    a second locking component rotatably buckled between the at least two stretching portions, the second locking component comprising:
        a second body having another piercing hole and another constraining hole connected to each other and a second locking hole, the another piercing hole misaligning with and being not communicated with the second locking hole, the another constraining hole being formed on an edge of the another piercing hole, the second locking hole and the another piercing hole being respectively located on opposite ends of the second body; and
    a pivoting component, comprising:
        a shaft passing through the piercing holes on the first locking component and the another piercing hole on the second locking component; and
        at least two blocks disposed on a lateral surface of the shaft, one of the at least two blocks being adapted to movably switch between the constraining holes on the first locking component and the second locking component, the other block being adapted to movably switch between the sliding slot on the first locking component and the constraining hole on the second locking component.

2. The locking mechanism of claim 1, wherein the at least two blocks are disposed on the lateral surface along an axial direction of the shaft.

3. The locking mechanism of claim 1, wherein the piercing holes align with each other, and the sliding slot aligns with the at least two constraining holes.

4. The locking mechanism of claim 1, wherein the pivoting component moves relative to the first locking component and the second locking component to be switched between a first position and a second position, one of the at least two blocks is engaged with one of the constraining holes on the first locking component and the other block is engaged with the constraining hole on the second locking component when the pivoting component is switched to the first position, one of the at least two blocks is engaged with the constraining hole on the second locking component and the other block is movably located inside the sliding slot when the pivoting component is switched to the second position.

5. The locking mechanism of claim 1, wherein one of the at least two blocks is engaged with the constraining hole on the second locking component, the other block is engaged with at least one constraining hole on the first locking component, and the second locking component is rotatably switched relative to the first locking component to be set on a first mode or a second mode.

6. The locking mechanism of claim 1, wherein the first locking component further comprises at least one fixing portion disposed on an outer side of the first body, the first locking component is installed on a casing via the fixing portion.

7. The locking mechanism of claim 1, further comprising:
    a bridging component passing through the piercing holes on the first locking component and the another piercing hole on the second locking component, an opening of the bridging component aligning with the sliding slot and the constraining hole on the second locking component, and being movably switched between the at least two constraining holes on the first locking component.

8. The locking mechanism of claim 1, further comprising:
    a resilient component disposed between the pivoting component and one of the at least two stretching portions.

9. The locking mechanism of claim 8, further comprising:
    a covering component disposed on one of the at least two stretching portions to contact against the resilient component.

10. The locking mechanism of claim 1, wherein the at least two constraining holes are respectively formed on different positions on the edges of the corresponding piercing holes, the sliding slot is an arc slot, and an arc length of the arc slot overlaps the at least two constraining holes.

11. An electronic device suitable for switchable security locks with different design, the electronic device comprising:
   a casing, the casing comprising an accommodating structure; and
   a locking mechanism, comprising:
      a first locking component, comprising:
         a first body disposed inside the accommodating structure, a first locking hole being formed on the first body;
         a first stretching portion disposed on an end of the first body, the first stretching portion having a first piercing hole, a first constraining hole and a second constraining hole connected to each other; and
         a second stretching portion disposed on the end and adjacent to the first stretching portion, the second stretching portion having a second piercing hole and a sliding slot connected to each other, the first piercing hole and the second piercing hole misaligning with and being not communicated with the first locking hole;
      a second locking component rotatably buckled between the first stretching portion and the second stretching portion, the second locking component comprising:
         a second body having a third piercing hole and a third constraining hole connected to each other and a second locking hole, the third piercing hole misaligning with and being not communicated with the second locking hole, the second locking hole and the third piercing hole being respectively located on opposite ends of the second body, wherein one of the security locks is assembled with the first locking hole or the second locking hole alternatively; and
      a pivoting component, comprising:
         a shaft passing through the first piercing hole, the second piercing hole and the third piercing hole;
         a first block disposed on a lateral surface of the shaft to be movably switched to the first constraining hole, the second constraining hole or the third constraining hole; and
         a second block disposed on the lateral surface and located by the first block to be movably switched to the third constraining hole or the sliding slot.

12. The electronic device of claim 11, wherein the second block is disposed by the first block along an axial direction of the shaft.

13. The electronic device of claim 11, wherein the second piercing hole aligns with the first piercing hole, and the sliding slot aligns with the first constraining hole and the second constraining hole.

14. The electronic device of claim 11, wherein the pivoting component moves relative to the first locking component and the second locking component to be switched between a first position and a second position, the first block is engaged with the first constraining hole or the second constraining hole and the second block is engaged with the third constraining hole when the pivoting component is switched to the first position, the first block is engaged with the third constraining hole and the second block is movably located inside the sliding slot when the pivoting component is switched to the second position.

15. The electronic device of claim 11, wherein the second locking component rotates relative to the first locking component to be switched between a first mode and a second mode, the first block is engaged with the first constraining hole and the second block is engaged with the third constraining hole when the second locking component is switched to the first mode, the first block is engaged with the second constraining hole and the second block is engaged with the third constraining hole when the second locking component is switched to the second mode.

16. The electronic device of claim 11, wherein the first locking component further comprises at least one fixing portion disposed on an outer side of the first body, the locking mechanism further comprises a fixing component assembled with the fixing portion to install the first locking component on the casing.

17. The electronic device of claim 11, wherein the locking mechanism further comprises a bridging component passing through the first piercing hole, the second piercing hole and the third piercing hole, an opening of the bridging component aligns with the sliding slot and the third constraining hole and is movably switched between the first constraining hole and the second constraining hole.

18. The electronic device of claim 11, wherein the locking mechanism further comprises a resilient component disposed between the pivoting component and the second stretching portion.

19. The electronic device of claim 18, wherein the locking mechanism further comprises a covering component disposed on the second stretching portion to contact against the resilient component.

20. The electronic device of claim 11, wherein the casing further comprises a sheltering component rotatably disposed on the accommodating structure.

* * * * *